(12) United States Patent
Neate et al.

(10) Patent No.: US 12,513,245 B2
(45) Date of Patent: Dec. 30, 2025

(54) VOICEMAIL HANDLING

(71) Applicant: MICROSOFT TECHNOLOGY LICENSING, LLC, Redmond, WA (US)

(72) Inventors: Nicolas Harry Neate, Reading (GB); Andrew John Robinson Hodges, Enfield (GB); Austin Francis Spreadbury, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 316 days.

(21) Appl. No.: 18/236,895

(22) Filed: Aug. 22, 2023

(65) Prior Publication Data
US 2024/0430363 A1 Dec. 26, 2024

(30) Foreign Application Priority Data
Jun. 22, 2023 (GB) ...................................... 2309456

(51) Int. Cl.
*H04W 4/12* (2009.01)
*H04M 3/533* (2006.01)

(52) U.S. Cl.
CPC ..... *H04M 3/5335* (2013.01); *H04M 3/53366* (2013.01)

(58) Field of Classification Search
CPC . G06F 40/30; G06F 3/167; G06F 3/16; H04L 63/1441; H04L 65/608; G09B 21/009; G10L 15/26; G10L 15/22; H04M 3/5335; H04M 3/53366; H04M 3/533; H04M 3/527
See application file for complete search history.

(56) References Cited

U.S. PATENT DOCUMENTS 12,250,342 B1 * 3/2025 Gall ................... H04M 3/4288
2025/0117261 A1 * 4/2025 Talavera ................. G06F 9/505

* cited by examiner

*Primary Examiner* — Phuoc H Doan
(74) *Attorney, Agent, or Firm* — Han Gim; Newport IP LLC

(57) ABSTRACT

An apparatus comprises a processor and a memory storing instructions that, when executed by the processor, perform a method comprising receiving a voicemail message and generating a prompt for a generative artificial intelligence (AI) model. The prompt comprises a request for a classification into one of a plurality of classes and audio signal features of the voicemail message. The method also comprises determining whether to delay passing the prompt to the generative AI model, and in response to determining to delay, delaying passing the prompt to the generative AI model. The prompt is passed to the generative AI model and a classification from the generative AI model is received. An action is triggered on the voicemail message according to the received classification. In various examples the action facilitates security and/or scalability of a voicemail service.

20 Claims, 6 Drawing Sheets

VOICEMAIL HANDLING

CROSS-REFERENCE TO RELATED APPLICATION

This non-provisional utility application claims priority to UK patent application number 2309456.8 entitled "VOICEMAIL HANDLING" and filed on 22 Jun. 2023, which is incorporated herein in its entirety by reference.

BACKGROUND

Voicemail services comprise functionality to interface with many calls such as voice over internet (VoIP) calls, to play pre-recorded prompts to callers, to store audio messages and also directory or indexing functionality with pointers to stored voicemail messages on a per-user basis. Traditional standalone voicemail systems deployed using private branch exchange (PBX) hardware are increasingly replaced or augmented with voicemail services deployed in the cloud using distributed, containerized applications.

Providing scalable voicemail services in an efficient manner is an ongoing problem as numbers of users grow, numbers of voicemail messages grow and where enterprises or other parties deploy voice mail services for growing organizations. Security is also a significant issue with respect to voicemail services, since malicious parties may implement "denial of service" type attacks whereby large volumes of voicemail are automatically generated in order to overwhelm and prevent voicemail services from operating correctly. Other types of security breach are possible via voicemail especially where voice commands are used to control computing equipment.

The embodiments described below are not limited to implementations which solve any or all of the disadvantages of known voicemail services.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Voicemail message processing is computationally expensive especially where voicemail services scale to large numbers of calling parties such as for enterprise deployments and/or where voicemail message processing is sophisticated, taking into account measured communications network characteristics, characteristics of VoIP sessions and other data. In various examples generative artificial intelligence (AI) technology is used in efficient ways to improve voicemail message processing by bringing security and/or scalability improvements.

An apparatus comprises a processor and a memory storing instructions that, when executed by the processor, perform a method comprising receiving a voicemail message and generating a prompt for a generative artificial intelligence (AI) model. The prompt comprises a request for a classification into one of a plurality of classes and audio signal features of the voicemail message. The method also comprises determining whether to delay passing the prompt to the generative AI model, and in response to determining to delay, delaying passing the prompt to the generative AI model. The prompt is passed to the generative AI model and a classification from the generative AI model is received. An action is triggered on the voicemail message according to the received classification. In various examples the action facilitates security and/or scalability of a voicemail service.

DESCRIPTION OF THE DRAWINGS

The present description will be better understood from the following detailed description read in light of the accompanying drawings, wherein.

DETAILED DESCRIPTION

Figure 1:
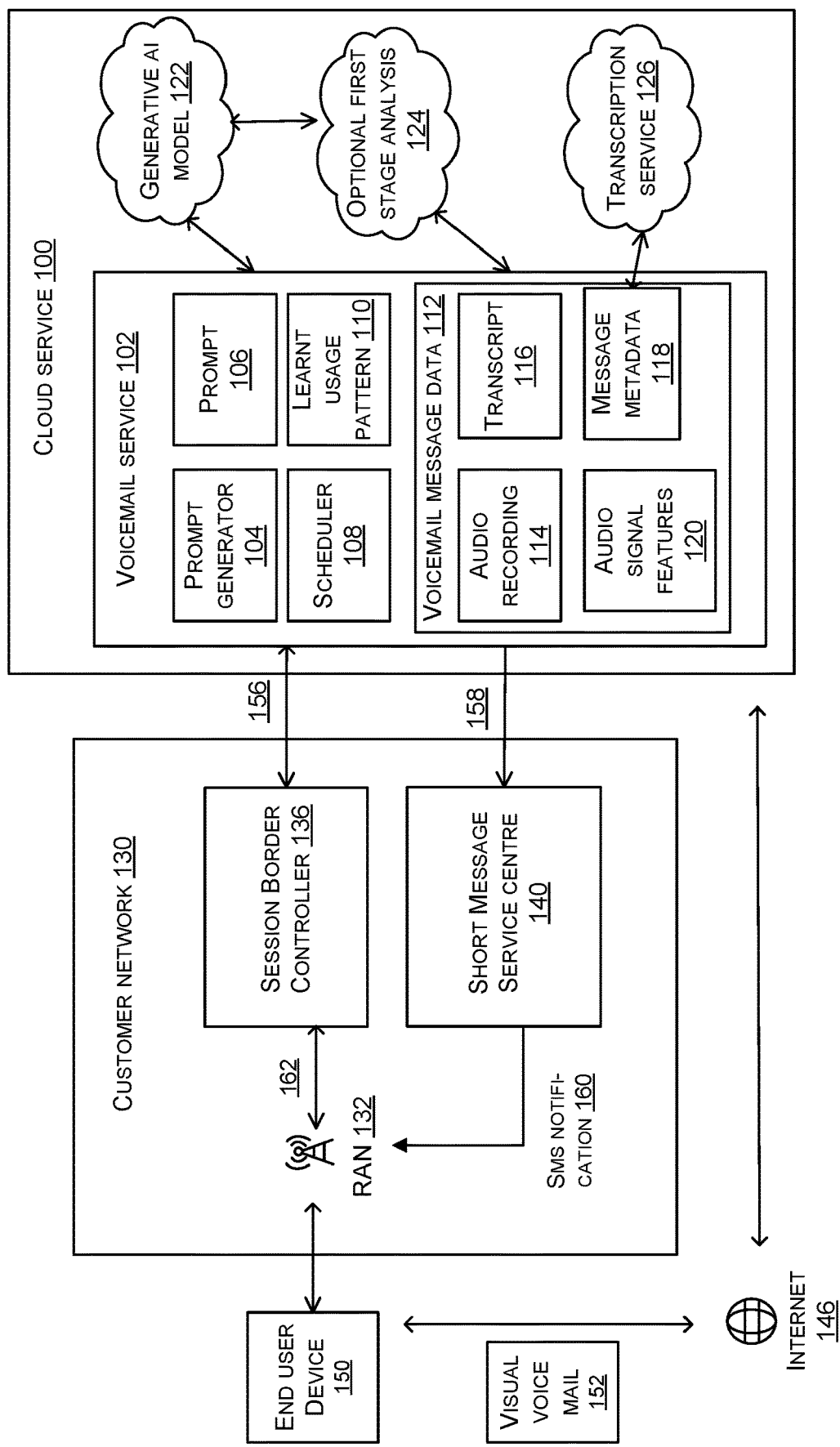
FIG. 1 is a schematic diagram of an apparatus for voicemail processing deployed in the cloud.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As described above, voicemail messages are typically handled by a voicemail service. The voicemail service is functionality in a communications network comprising nodes with functionality to store voicemail as part of a voice call for many thousands, hundreds of thousands, millions or more users, and enable it to be accessed by the appropriate users at the appropriate times. Scalability is a significant problem since it is unacceptable to have any wait times during recording or playing of a voicemail message in contrast to other types of large-scale computing systems where delays in accessing data is often the norm. Security is another problem both from the point of view of the telecommunications provider, providing voicemail services, and from the point of view of end users. Denial of service attacks whereby a voicemail service is overwhelmed with automatically generated voicemail requests may lead to loss of service. Attacks whereby malicious parties reach voicemail boxes and guess voicemail passwords to gain unauthorized access pose significant risk since hijacked voicemail accounts may be used for malicious purposes.

Many voicemail messages often arrive in the same inbox including messages of different types such as both private and work messages, urgent and non-urgent messages, messages with high priority and those which are related to spam and phishing. Traditionally, a user retrieves voicemail messages by calling a voicemail service and listens to each of their voicemail messages in the order in which the messages arrived at the voicemail service. This is inefficient and time consuming. More recently, visual voicemail has become available. Visual voicemail is direct-access voicemail with a visual interface. A list of voicemail messages are presented which the user may select to be played, along with some basic information about the voicemail such as its length, or the phone number from which it was received. Visual voicemail services sometimes provide transcripts of voicemail messages and display the transcripts to the user. However, since the user is presented with the entire transcript and is required to manually perform actions on the voicemail messages on the basis of the transcript, interaction with the voicemail service is still inefficient and time consuming. Furthermore, important information is lost during transcription for example tone of voice of the person leaving the voicemail, lengths of any pauses, or whether there is background noise. Disclosed herein are methods and systems for classifying voicemail messages and triggering actions to be performed on voicemail messages based on those classifications. Various types of action are used to facilitate scalability such as filtering, load balancing, delaying processing until quiet times. Various types of action are used to facilitate security including automatic closing of accounts, alerts, notifications.

FIG. 1 is a schematic diagram of an apparatus for voicemail processing deployed in a communications network. The apparatus comprises one or more communications network nodes such as servers, compute nodes, telecommunications network nodes or other nodes, which have functionality providing a voicemail service and for processing voicemail messages. Depicted in FIG. 1 is a voicemail service 102 which obtains voicemail messages. The voicemail service 102 is shown in FIG. 1 as a single entity although it may be functionality distributed over a plurality of nodes or in a datacenter. In the example of FIG. 1 the voicemail service 102 is deployed in the cloud as part of cloud service 100. The cloud service 100 comprises a generative AI model 122, an optional first stage analysis 124 and a transcription service 126 all of which are computer implemented. The voicemail service 102 comprises a prompt generator 104, a prompt store 106, a scheduler 108, an optional store of learnt usage patterns 110, a store of voicemail message data 112. The store of voicemail message data 112 comprises a store of audio signal features 120, and sometimes one or more of: a store of audio recordings 114, a store of transcripts 116, a store of message metadata 118.

In the example of FIG. 1 the cloud service 100 is connected via a layer 3 switch or other hardware to a customer communications network 130. Examples of customer communications networks are the public switched telephone network, a mobile network, and a radio access network at a customer site such as an oil rig, factory, campus or other site. The customer network comprises a session border controller 126 to manage the connection between the customer network and the cloud service. In various examples the customer network also comprises a short message service center 140. The customer network 130 of FIG. 1 is a non-limiting example included to aid understanding of the technology and the skilled reader understands that other arrangements of communications network connecting to the cloud service 100 are used in some cases.

In the example of FIG. 1, a telephone call (e.g. call 162) originating from end user device 150 such as a mobile phone is routed through a session border controller (SBC) 136 from a radio access network (RAN) 132 to voicemail service 102. In other examples a call is a VOIP call or a call from a fixed-line telephone. In various examples the RAN 132 is a 5G network and the SBC is part of an IMS (IP Multimedia subsystem) core. The IMS core and SBC are part of a customer network 130 in some examples. The telephone call 162 is from end user device 150 with the aim of accessing any voicemail messages available for a user of end user device 162. Suppose there is one voicemail message available for the caller. Voicemail service 102 obtains voicemail message data 112 including an audio recording of the voicemail message 114 and message metadata 118.

In various examples, voicemail service 102 sends an audio recording 114 of a voicemail message to transcription service 126, which computes a transcript 116 of the audio recording. The transcription service performs speech to text transcription using any speech to text functionality including but not limited to: Dragon (trade mark), Alexa (trade mark), Azure Speech services (trade mark). In some scenarios, the transcription service is deployed as a cloud service 100.

Once voicemail service 102 has received a voicemail message, a method implemented by the voicemail service 102 generates a prompt 106 for a generative artificial intelligence (AI) model 122. Prompt 106 comprises a request for a classification into one of a plurality of classes as well as audio signal features of the voicemail message 120. Relating to attempts at fraudulent activity for example, the message is classified as one of: spam, phishing, or not-spam. In an example relating to priority of a message, the message is classified as high, medium or low priority. Other examples include the message being classified as private, personal or work related. Data related to the voicemail message may be used in order to analyze a sentiment of a voicemail message. For example, the generative AI model classifies the voicemail as angry, upset, happy, or urgent based on sentiment analysis.

The prompt is passed to generative AI model 122 and a classification is received from the generative AI model, classifying the voicemail into one of the plurality of classes. Generative AI model 122 is an artificial intelligence model which creates new content e.g., text in response to a prompt. An example of a generative AI model is a large language model (LLM), which is a neural network having millions or more parameters and comprising one or more transformer neural networks, such as a generative pretrained transformer (GPT) neural network e.g., the GPT neural network currently available from OpenAI (trademark). In some examples the generative AI model 122 is multi-modal whereby it is able to receive prompts in different modalities including but not limited to: image, video, audio, text. In some cases the generative AI model is a machine learning model which is a foundation model.

The generative AI model is given a prompt 106 which is generated by the voicemail service 102 for example by prompt generator 104. The prompt comprises a request for classification as well as data related to the voicemail message. The prompt comprises only text in some cases. The prompt comprises text and audio in some cases. The prompt comprises audio signal features of the voicemail message in some cases. The prompt comprises a request for at least one classification. Sometimes the prompt comprises a request for multiple classifications, such as to indicate whether the message is a security risk or not and also whether the message is urgent or not. An example of a prompt generated by the voicemail service 102 is:

"Tell me whether this voicemail message is a security risk or not [insert transcription of voicemail message concatenated with the voicemail metadata and an audio file of the metadata]." The generative AI model receives the prompt and computes an embedding of the prompt in a multi-dimensional space using an embedding process such as word2vec (where the prompt comprises text) or other embedding process. Where the prompt comprises an audio file the generative AI model computes an embedding of the audio file and concatenates the audio file embedding and the embedding of the text part of the prompt. The embedding of the audio file is computed using a neural network such as OpenL3 (trade mark), SoundNet (trade mark), L3-Net or others. The generative AI model processes the embedding of the prompt using one or more transformers or other neural network components and decodes the embedding to compute text output which is returned to the voicemail service 102. The text output comprises a classification such as "the voicemail message is not a security risk and my assessment is 60% certain" or "the voicemail message is not a security risk".

A scheduler 108 determines when to pass the prompt to the generative AI model. The scheduler determines whether to delay passing the prompt to the generative AI model. This is based on e.g., a learnt usage pattern 110 of end user 150 or user input 120. Passing the prompt is delayed in order to use computational resources more efficiently such as by processing voicemails at night when computing resources that are busy in the day become available.

Once the classification is received from the generative AI model, an action is triggered on the voicemail message according to the classification. For example, voicemail service 102 may notify end user 150 that a voicemail message has been classified via a short messaging service (SMS) notification 160. In various examples a short message service center (SMSC) 140 is also part of customer network 130. SMS (short messaging service) notifications such as SMS notification 160 are sent from SMSC 140 to an end user device 150 via the RAN 132. Sometimes, an SMS message is sent when the voicemail message is classified into specified classes such as "urgent", "security risk", or "angry".

In other examples, the voicemail classification is communicated to the user via an audio prefix. For example, the audio prefix is synthesized speech corresponding to the wording "You have three new work messages and two new personal messages". The synthesized speech is generated by the voicemail system using any suitable text to speech software.

Other actions triggered on the voicemail involve visual voicemail application 152. In examples a user accesses their voicemail messages using visual voicemail application 152 on their device 150 which is connected to the voicemail service 102 via the internet 146. Actions include sending a notification via the visual voicemail application and changing the way in which voicemail messages are presented to the user e.g., by presenting voicemails classified as high urgency higher up a list. Other examples involve presenting the voicemails in a different color, with a word or symbol next to them, or in different folders e.g. a "SPAM" folder. In an example where a voicemail message is classified as representing a high security risk or denial of service attack the voicemail message is deleted. In some cases where the voicemail message is classified as a security risk it is passed to another automated system for checking before being released to the end user.

The action in some scenarios depends on the relative frequency with which voicemails in a particular class are received at a voicemail inbox. For example, a different action may be triggered when an "angry" voicemail message is detected if the inbox rarely receives "angry" voicemail messages.

As explained in more detail below, in some examples an optional first stage analysis 124 is performed on voicemail message data 112 before classification by the generative AI model 122.

Examples of data related to the voicemail message include an audio recording of the voicemail message 114, features of the audio recording 166, a transcript 116 of the voicemail message and message metadata 118.

Message metadata 118 provides context to the data contained within the voicemail message. Example message metadata includes the date and time at which the voicemail message was received, the telephone number from which the voicemail message was received, the country code of the telephone number from which the voicemail message was received, the history of interactions between the voicemail recipient and the telephone number from which the voicemail message was received, and the length of the voicemail message. Also, in some scenarios multiple telephone numbers share the same voicemail inbox e.g., a landline and a mobile number associated with the same user. Message metadata 118 in these scenarios includes whether the voicemail was left for the landline or the mobile number.

In various examples, message metadata 118 comprises identifiers relating to the origin of the voicemail message. These include the telephone number from which the received message originated (caller ID), the country code and/or area code of the originating telephone number, whether or not the telephone number is known to the user e.g., based on determining whether the telephone number is stored in association with a contact of the user.

The history of interactions between the voicemail recipient and the originating telephone number is another example of message metadata. For example, the number of past calls from the caller, the frequency of calls from the caller, the time and date of past calls from the caller, whether or not past calls from the caller were picked up, whether any previous voicemail messages have been left from the caller and data relating to any previous voicemail messages. In examples the generative AI model uses the identifiers described herein in order to classify the voicemail message into one of a plurality of classes.

In scenarios where the generative AI detects whether or not the voicemail message is a spam or phishing voicemail message, classification by the generative AI may be used to track the reputations of telephone numbers. For example, telephone numbers which leave spam voicemail messages are reported to a database and stored in a deny list.

In various examples voicemail message data 112 comprises a transcript 116 of the voicemail message which is generated by transcription service 126. The transcript contains the words which are spoken in the voicemail message as text.

Data relating to the voicemail message which is included in the prompt 106 passed to the generative AI model 112 sometimes includes an audio recording 114 of the voicemail message. The audio recording 114 may be included in the prompt as the values of a Mel spectrogram, or the cepstral coefficients of a Mel spectrogram, created from the audio recording.

In various examples, features are extracted from the audio recording of the voicemail message and included in the prompt. Features include one or more of the following: the level of background noise, the length of a pause at the beginning of the voicemail message, the pitch of the voice, variations in pitch over time, the speed of speech, variations in speech over time, the volume of speech, variations in volume of speech over time, the frequency and duration of any pauses in speech.

Data related to the voicemail message used for classification of the message may include any of the example data provided herein or any combination of those examples In various examples a method comprises a first stage analysis 124 of the voicemail message prior to generating the prompt. The first stage analysis is for example a machine learning model or look-up table. The first stage analysis is computationally cheaper than processing using a generative AI model because the generative AI model has a very high number of model parameters and is expensive to run.

The first stage analysis classifies the voicemail message into one of the plurality of classes e.g., the same question is asked to the first stage analysis to the generative AI model. In other examples, the first stage analysis is preliminary analysis, which produces an output which is passed to the generative AI model 122 in the prompt 106.

Figure 3:
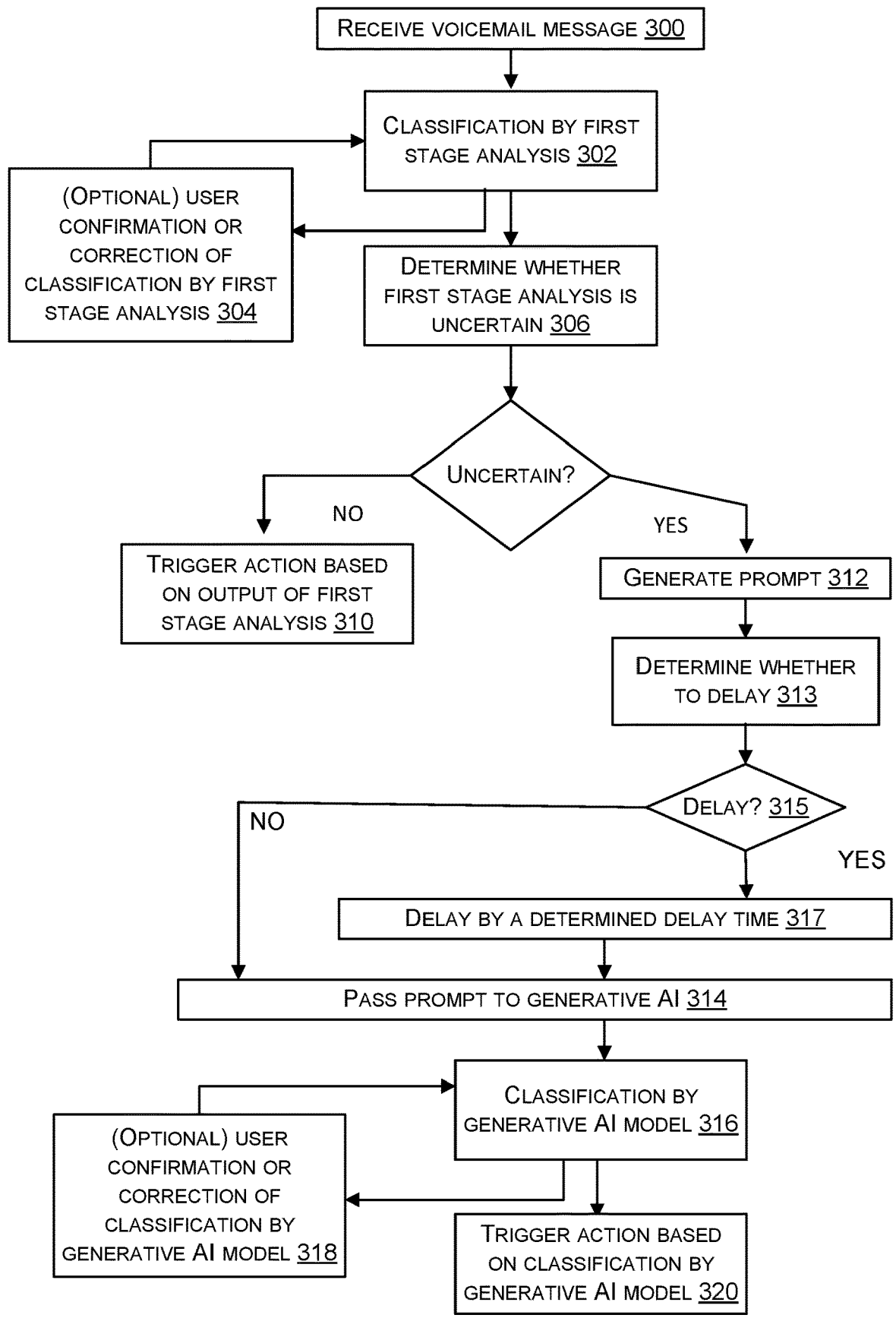
FIG. 3 is a flow diagram of a method for processing voicemail messages including a first stage analysis.

FIG. 3 is a flow diagram of a method for classifying voicemail messages including a first stage analysis. A voicemail message is received (300). At block 302 the first stage analysis performs classification of the received voicemail message.

Classification at the first stage may be performed by a custom trained machine learning model which is trained for voicemail classification. In various examples, the custom trained machine learning model is trained to classify a voicemail message based on any one or more of: the transcription of the voicemail message 116, message metadata 118, audio recording of the voicemail message 114 or extracted features of the audio recording of the voicemail message. The architecture of the custom trained machine learning model is for example a neural network such as a multi-layer perceptron. In some cases the machine learning classifier is a support vector machine or a random forest.

In other examples the first stage analysis is a look-up table whereby an originator address of a voicemail message, or other voicemail message metadata is looked up to identify whether the voicemail message is likely to be a security risk or of a particular priority or other class. For example, it is known that most calls from a particular area/country code are spam and therefore the first stage analysis in some examples involves looking up the area or country code of the originating telephone number.

The look-up table sometimes comprises a reputation database which contains information on malicious entities. In some examples the reputation database is updated in near-real-time as a result of ongoing analysis of information from the voicemail service or the telephone network or both. The updating of the reputation database may be achieved by a machine-learning algorithm which dynamically maintains the look-up table.

In FIG. 3 the first stage analysis also provides a measure of the uncertainty in the classification provided by the first stage analysis. Where the first stage analysis is computed using a machine learning classifier the machine learning classifier may output a classification as well as an indication of the uncertainty of the classification. In an example where the classifier is a random forest the uncertainty is given by an aggregation of variances of distributions of values stored at a leaf node indexed in each tree of the forest. In an example where the machine learning classifier is a neural network an activation level of neurons in an output layer of the neural network may be used to compute the uncertainty. In some scenarios, the first stage analysis provides a classification with an acceptable degree of certainty whereas in other scenarios the classification provided by the first stage analysis is too uncertain to be useable. An acceptable level of certainty is a numerical certainty value which is above a threshold, where the threshold is determined empirically. At block 306 the method determines whether the first stage analysis is uncertain. If the degree of uncertainty is below a threshold, then an action is triggered based on the output of the first stage analysis (310). If the degree of uncertainty is unacceptably high (above a threshold) then the method generates a prompt (312) which is passed to the generative AI model (314). The scheduler determines whether to delay passing the prompt to the generative AI (313). If the scheduler determines to delay at block 315 then the method delays passing the prompt to the generative AI (314) by a determined delay time (317). Classification is performed by the generative AI model (316). An action is triggered based on classification by the generative AI model (320). The thresholds are determined empirically through trial and error or are set by an operator.

In some examples, the classification of the voicemail message by the first stage model is confirmed or corrected by user input (304) e.g. if the first stage analysis classifies a voicemail message as spam, the user can listen to the message, or read the message transcript, and provide input which either confirms that the message is spam or correct the classification by providing a corrected classification wherein the message is marked as "not spam" or "important". Sometimes the user confirmation or correction is used to improve the first stage analysis. E.g., if the first stage analysis is a custom trained machine learning model, then the user confirmation or correction is used to periodically retrain the custom trained machine learning model.

A user can also confirm or correct the classification produced by the generative AI model (block 318 in FIG. 3). In some examples, the user confirmation or correction is used to improve the performance of the generative AI model. For example, the outcomes of user confirmation/correction are included in future prompts to the generative AI model as well as data relating to the voicemail messages which the confirmation/correction corresponds to. This means that the performance of the generative AI model is improved, i.e. by taking into account ground truths regarding classification provided by the user, without retraining the entire model which is computationally expensive. Optionally, the generative AI model is adapted periodically with a batch of data from user confirmations and corrections corresponding to multiple voicemail messages.

The batch of data may include confirmations/corrections provided by the user in relation to classification by the generative AI model or classification in relation to the first stage classification or both. Similarly, the first stage analysis may be improved by providing the model with confirmations or corrections obtained from a user in relation to the generative AI model.

The user is able to provide input confirming or correcting the output of the first stage analysis, or the generative AI model, or both. In some scenarios, there is no first stage analysis and in those scenarios the user only confirms or corrects classifications produced by the generative AI model. In some scenarios where the user provides input confirming or correcting the output of the first stage analysis, a prompt is not passed to the generative AI model in order for the generative AI model to classify a voicemail message.

Information relating to the classification by the first stage analysis is included in prompt 106 in some examples. In some scenarios, output from the first stage analysis including the classification as well as the uncertainty estimate is included in the prompt.

In some examples a method comprises determining whether to delay the passing of the prompt to the generative AI model. In response to determining whether to delay, the passing of the prompt is delayed. If many requests for voicemail classification arrive at the same or similar times, the resource on which the generative AI runs (such as cloud service 100), becomes busy. Therefore, an advantage of delaying passing the prompt to the generative AI model is the more efficient use of computational resources. This is because the scheduler 108 delays the processing by the generative AI model to a time when the resource is likely to be less busy.

Scheduler 108 determines whether to delay based for example on a learnt usage pattern 110. The learnt usage pattern 110 may be learnt by a machine learning model. Learnt usage pattern 110 is a pattern of use of the voicemail service which contains information about when a voicemail inbox is accessed. For example, the learnt usage pattern identifies time periods where voicemail messages are likely to be accessed by a user and time periods where voicemail messages are unlikely to be accessed by a user. If a voicemail inbox corresponds to a user's work telephone number then that user might typically access voicemail messages Monday to Friday at 9 am when he or she starts work. Other users might access their voicemail messages when they arrive home at 6 pm.

Additionally or alternatively, scheduler 108 determines whether to delay the passing of the prompt based on a user's calendar. Based on calendar information about times when a user is busy the scheduler identifies times when the user is unlikely to access voicemail messages.

Using a learnt usage pattern, a user calendar or any other suitable information, scheduler 108 identifies time periods where voicemails are unlikely to be accessed by a user e.g., overnight. One way of determining the delay is to match up time periods where the user is unlikely to access the voicemail message with time periods where the resource on which the generative AI model runs is quiet. Scheduler 108 may monitor how busy the generative AI resource is, and delay the passing of the prompt until a time when the resource has processing capacity, which is also a time before the end user is likely to access the voicemail message.

Figure 2:
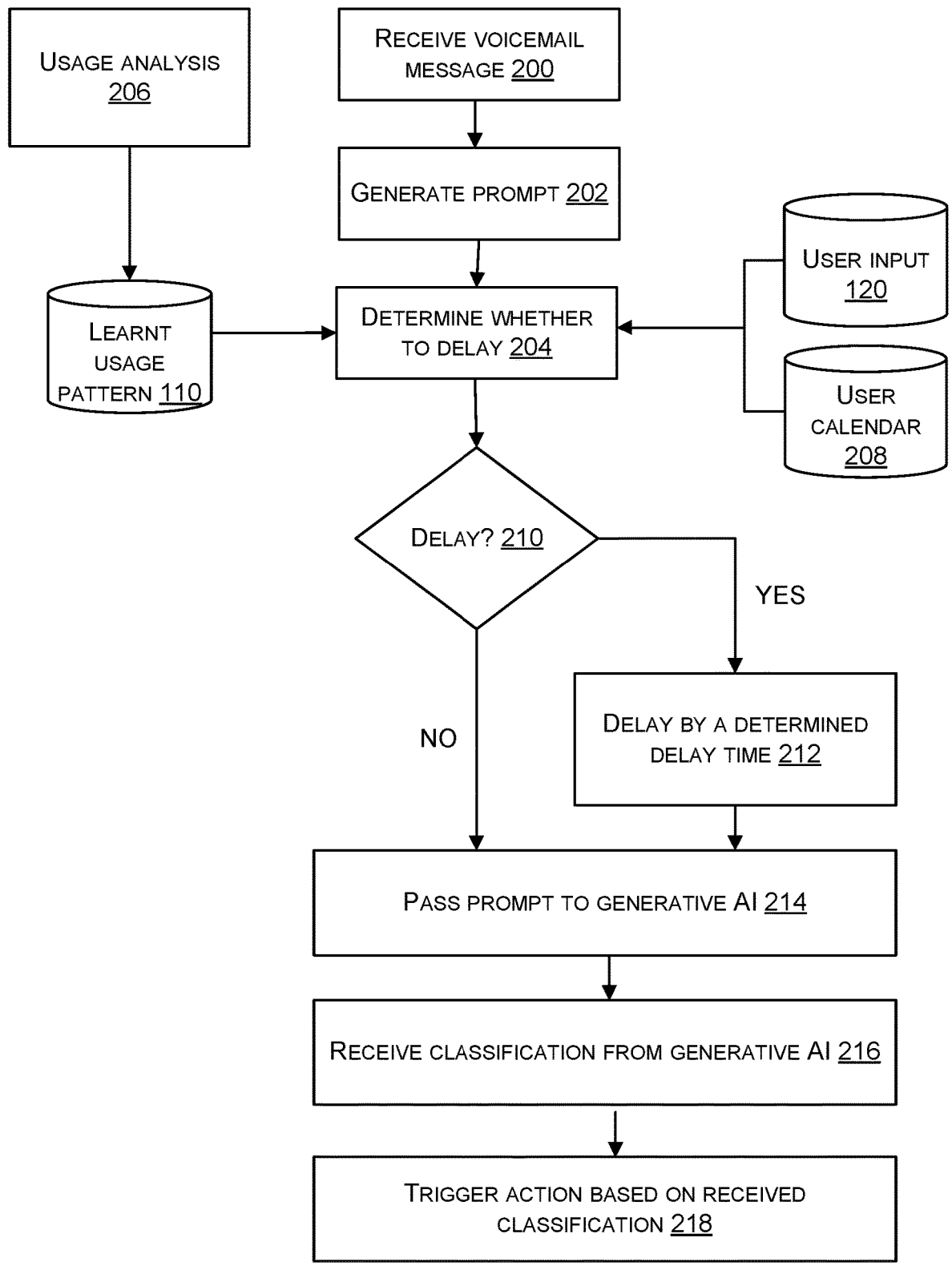
FIG. 2 is a flow diagram of a method for processing voicemail messages including delayed processing by a generative artificial intelligence model.

FIG. 2 is a flow diagram of a method for processing voicemail messages including delayed processing by a generative artificial intelligence model. A voicemail message is received (200) and a prompt is generated (202). The prompt is generated automatically by using a script or a template. At block 204 the method determines whether to delay passing the prompt to the generative AI model. The determination of whether to delay 204 is made using rules that take into account one or more of: user input 120, the calendar of a user 208, and a learnt usage pattern 110 derived from usage analysis 206 such as the usage analysis described above which is performed by scheduler 108.

If the scheduler determines to delay at block 210 then the method delays passing the prompt to the generative AI (214) by a determined delay time (212). The scheduler may determine not to delay if e.g., the user indicates that a classification should be received as soon as possible because the user wishes to access their voicemails or clear their voicemail inbox. Alternatively or additionally the scheduler may determine not to delay if the voicemail message is received at a quiet time for the generative AI model. After passing the prompt to the generative AI model (214), a classification is received from the generative AI model (216). Based on the received classification, an action is triggered (218).

Although the explanation provided above refers to delaying the passing of the prompt to the generative AI model, any of the steps preceding the processing of data relating to the voicemail message by the generative AI model may be delayed.

Once the classification has been received from the generative AI model, an action which depends on the classification from the generative AI is automatically performed on the voicemail message. In various examples the action comprises one or more of: moving the voicemail message from a first folder to a second folder, adjusting the priority of user notifications relating to the voicemail message, adding an audio prefix to a telephony user interface, reporting the voicemail message, deleting the voicemail message, causing a display light to flash, sending an SMS (short messaging service) message.

In various scenarios voicemail service 102 stores voicemail messages in various folders. On the basis of the received classification, the voicemail service may move the voicemail message from one folder to another.

In some examples, a voicemail message is associated with a level of priority. Based on the classification the priority of the voicemail may be adjusted. For example, if the voicemail is classified as urgent, the priority of the voicemail message is adjusted to be higher. Higher priority messages may be played before lower priority messages when a user plays voicemail messages through a telephony user interface, or displayed to the user higher up a list in a visual voicemail application.

Based on the classification, an audio prefix is added to a telephony user interface in some examples. The audio prefix for example informs the user of the number of voicemail messages which have been classified as urgent, the number of messages classified as spam, or the number of messages classified as private. The audio prefix is able to inform the user of the order in which the voicemail messages will be played based on the classification.

In other scenarios, an SMS message is sent to a user in order to inform the user of the classification of the voicemail message e.g. an SMS message is sent to the user stating that an urgent voicemail message has been received.

Additionally or alternatively, notification is sent from the visual voicemail application informing the user of the classification, or a display light on the user's telephone flashes in order to communicate with the user. For example, a red light flashes when a voicemail message is classified as urgent.

In some scenarios, a voicemail message is classified as an attempt at fraudulent activity. Based on this classification, the voicemail message may be reported e.g. to a database or to a relevant authority and/or deleted.

The voicemail message may be automatically deleted or moved to quarantine on the basis of the classification e.g., if the voicemail message is a spam message and there is therefore a high likelihood that the user will never want to listen to the message.

Figure 4:
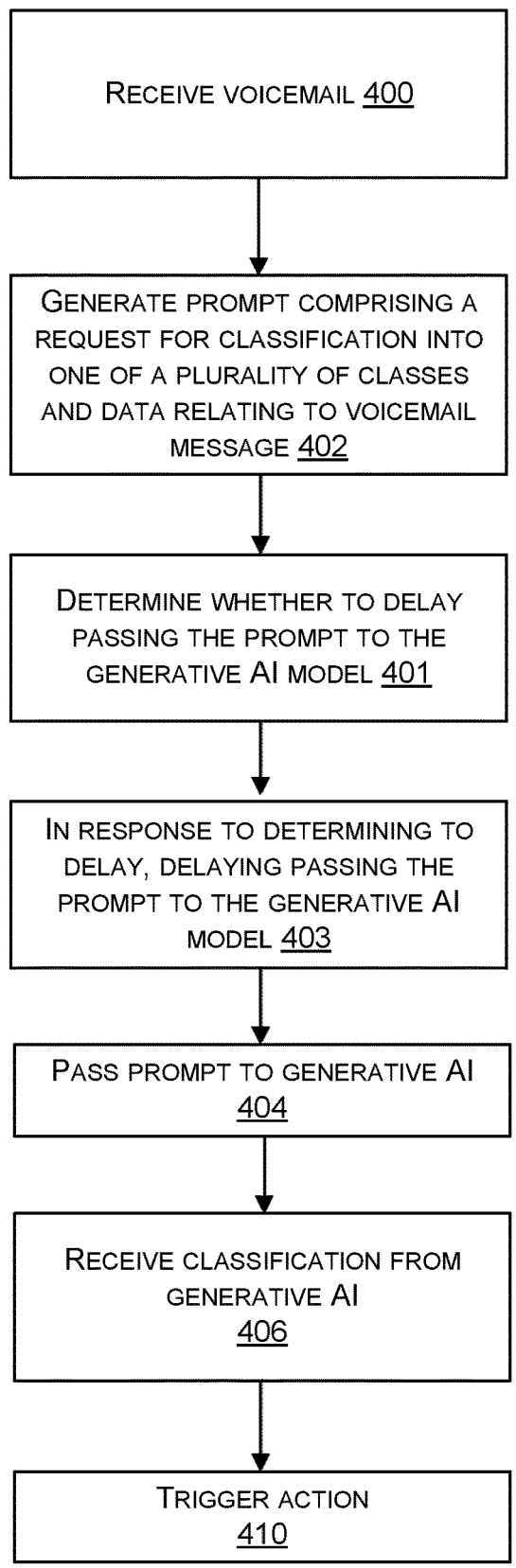
FIG. 4 is a flow diagram of a method for processing voicemail messages using a generative artificial intelligence model.

FIG. 4 is a flow diagram of a method for processing voicemail messages using a generative artificial intelligence model. The method depicted in FIG. 4 is for example implemented by voicemail service 102. At block 400 a voicemail is received, for example through customer voice network 134. A prompt is generated which comprises a request for classification into one of a plurality of classes and data relating to the voicemail message (402). For example the prompt is prompt 106 and the prompt is generated by prompt generator 104 in FIG. 1. At block 401 a scheduler for example scheduler 108 determines whether to delay passing the prompt to the generative AI model. In response to determining to delay, passing the prompt to the generative AI model is delayed (403). The prompt is passed to a generative AI model (404) such as generative AI model 122 which may run on cloud service 100. A classification is received from the generative AI model (408) and an action is triggered on the voicemail message according to the received classification (410).

Figure 5:
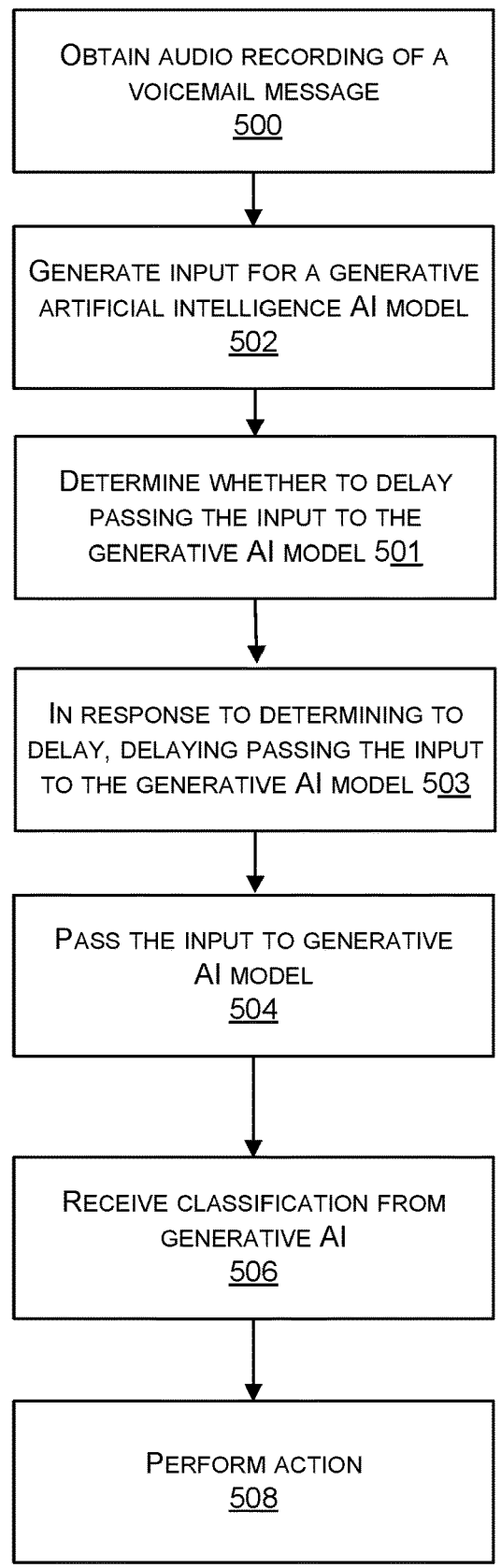
FIG. 5 is a flow diagram of a method for processing an audio recording of a voicemail message using a generative artificial intelligence model.

FIG. 5 is a flow diagram of a method for classifying an audio recording of a voicemail message using a generative artificial intelligence model. The method in FIG. 5 is also implemented by voicemail service 102 in various examples. At block 500 an audio recording of a voicemail message is received. The audio recording is recorded during a call and is received by voicemail service 102 through customer voice network 134. Input for a generative AI model is generated (502) wherein the input comprises the audio recording of the voicemail message as well as a request for classification of the audio recording into one of a plurality of classes. At block 501 a scheduler for example scheduler 108 determines whether to delay passing the input to the generative AI model. In response to determining to delay, passing the input to the generative AI model is delayed (503). At block 506 a classification is received from the generative AI model, and at 508 an action is performed on the voicemail message. The action depends on the classification from the generative AI model.

A method comprises receiving a voicemail message, generating a prompt which comprises a request for a classification into one of a plurality of classes and data related to the voicemail message, determining whether to delay passing the prompt to a generative AI model, in response to determining to delay, delaying passing the prompt to the generative AI model, and passing the prompt to a generative AI model. A classification is received from the generative AI model. Using a generative AI model for classification means that the large number of parameters and high volume of data used to train the model are leveraged in order to improve performance of voicemail classification for example by improving accuracy. Furthermore, generative AI models are capable of not only providing a classification but also additional information such as reasons for the classification. This information may be conveyed to the end user in a user-friendly way e.g. in simple language which helps the user to interact with the voicemail service. An action is automatically triggered on the voicemail message according to the received classification.

Data related to the voicemail message comprises one or more of: a transcript of the voicemail message, metadata of the voicemail message, an audio recording of the voicemail message in various examples. Metadata of the voicemail message includes identifiers relating to the origin of the voicemail message. Using metadata of the voicemail including identifiers helps the generative AI model to classify the message thereby improving performance. Useful information is contained within metadata because often voicemail messages with the same classification originate from the same telephone number or country, are received at certain times and/or target a telephone number e.g. one which appears on a list obtained by scammers. Using an audio recording of the voicemail message allows useful data to be taken into account during classification, which is otherwise lost by transcription. These include e.g. pitch of speech, tone of voice, pauses in speech and intonation. Analysis of audio signals in the manner described herein therefore improves the classification of a voicemail message.

In various examples the prompt comprises a request for classification and audio signal features which are abstracted so that security and privacy are enhanced. For example, the audio signal features comprise one or more of: a length of time from a start of a call until an audio signal is above a threshold, anonymized spectrogram features computed from an audio signal of the voicemail message.

Passing the prompt to the generative AI model is for example delayed to a time when a cloud service running the generative AI model is less busy. This allows for the more efficient use of computational resources during classification of a voicemail message. Determining whether to delay is based on one or more of a learnt usage pattern of a user, a calendar of user, and input from a user in various scenarios.

The method may comprise a first stage analysis of the voicemail message prior to generating the prompt wherein the first stage analysis comprises classifying the voicemail message into one of the plurality of classes. In response to the first stage analysis being uncertain, the prompt is generated. Including a first stage analysis means that classification becomes more efficient in terms of use of computational resources. The first stage analysis is less computationally expensive than classification with a generative AI model. By processing with a generative AI model only when the first stage analysis is uncertain, classification becomes less computationally expensive. Meanwhile, accuracy of classification is maintained because the generative AI model is used when the first stage analysis is uncertain. The first stage analysis may comprise a custom trained machine learning model and/or a look-up table.

The first stage analysis is, in some scenarios, updated with user input confirming or correcting the classifying of the voicemail message in the first stage analysis. This improves the performance of the first stage analysis as the user input is taken as ground truth and taking this into account makes the first stage more accurate. It also makes the overall classification more efficient because when the first stage is more accurate and less uncertain, the comparatively expensive generative AI model is used less often.

In some examples, the generative AI model is updated with user input confirming or correcting the classifying of the voicemail message in the first stage analysis. This improves accuracy of classification because the generative AI model leverages the ground truth user input. The performance of the classification is better because the generative AI model is able to use ground truth data related to the user's received voicemail messages which are often similar to the voicemail message to be classified.

Further examples involve including data relating to the first stage analysis in the prompt. For example the prompt includes the classification assigned to the voicemail message by the first stage analysis and a measure of uncertainty associated with the classification. This means that the generative AI model leverages the analysis performed at the first stage thereby improving performance. For example, the generative AI model may use an indication from the first stage analysis to process a voicemail message in a different way.

Where a delay is implemented, a signal is sometimes provided to the user wherein the signal indicates to the user that a classification has not yet been received. This improves the user's interaction with the voicemail service and means that resources are used more efficiently because they are not used to access or attempt to access the voicemail before classification has been received. Examples of the signal are moving the voicemail from a first folder to second folder, a flashing light, an audio signal, a color.

An example of a classification is classifying the voicemail message as private according to sentiment analysis of the voicemail message. This is privacy-enhancing because it means that the user may choose to play private messages using headphones or when there are no other people around. Other examples include classifying the message as urgent or as an attempt at fraudulent activity.

Triggered by the classification, various actions are performed in different scenarios including moving the voicemail message from a first folder to a second folder, adjusting the priority of user notifications relating to the voicemail message, adding an audio prefix to a telephony user interface, causing a display light to flash, deleting a voicemail message, and sending an SMS message. These actions mean that the user is able to efficiently access voicemail messages. Sometimes the voicemail message is automatically deleted. In other examples the voicemail message is reported e.g., to a relevant authority. This improves security and allows a database of attempts at fraudulent activity to be compiled. the voicemail message, deleting the voicemail message, causing a display light to flash, and sending a short messaging service SMS message.

Figure 6:
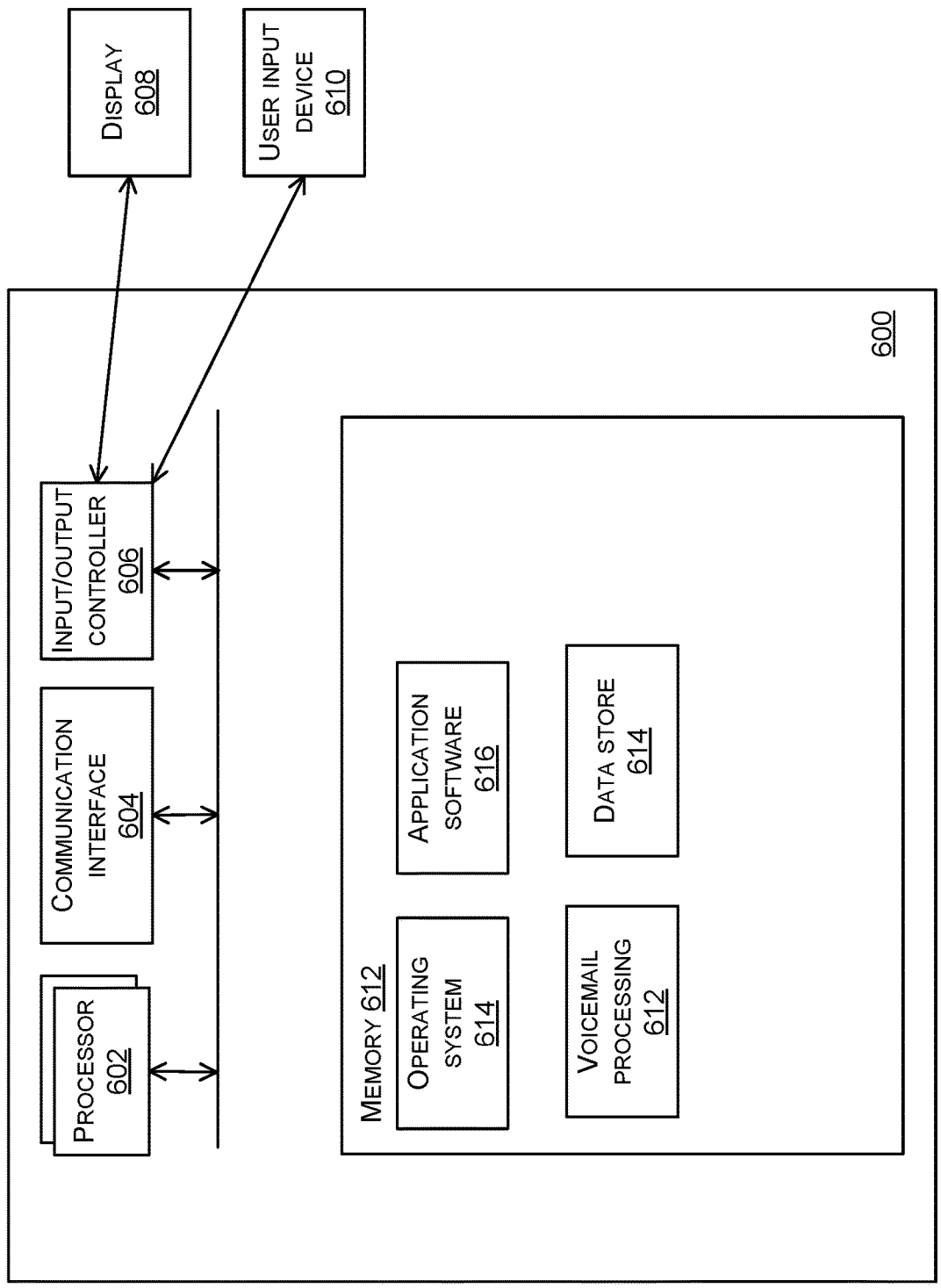
FIG. 6 illustrates an exemplary computing-based device for deploying a voicemail processing service.

FIG. 6 illustrates various components of an exemplary computing-based device in which embodiments of the voicemail processing are implemented. Computing-base device 600 is a node in a data center, or a server, or a communications network node or any other computing device.

Computing-based device 600 comprises one or more processors 602 which are microprocessors, controllers or any other suitable type of processors for processing computer executable instructions to control the operation of the device in order to perform voicemail processing such as using the methods disclosed herein. In some examples, for example where a system on a chip architecture is used, the processors 602 include one or more fixed function blocks (also referred to as accelerators) which implement a part of the method of automatically generating technical data in hardware (rather than software or firmware). Platform software comprising an operating system 614 or any other suitable platform software is provided at the computing-based device to enable application software 616 to be executed on the device. A voicemail processing functionality 612 is present as well as a data store 614 storing voicemail, usage patterns, thresholds, prompts, scripts for forming prompts, voicemail metadata or other data.

The computer executable instructions are provided using any computer-readable media that is accessible by computing based device 600. Computer-readable media includes, for example, computer storage media such as memory 612 and communications media. Computer storage media, such as memory 612, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 612) is shown within the computing-based device 600 it will be appreciated that the storage is, in some examples, distributed or located remotely and accessed via a network or other communication link (e.g. using communication interface 604). The computing-based device may be connected to other nodes of a communications network via communication interface 604.

The computing-based device 600 also comprises an input/output controller 606 arranged to output display information to a display device 608 which may be separate from or integral to the computing-based device 600. The display information may provide a graphical user interface. The input/output controller 606 is also arranged to receive and process input from one or more devices, such as a user input device 610 (e.g. a mouse, keyboard, camera, microphone or other sensor). In some examples the user input device 610 detects voice input, user gestures or other user actions and provides a natural user interface (NUI). This user input may be used to form prompts and check classifications. In an embodiment the display device 608 also acts as the user input device 610 if it is a touch sensitive display device. The input/output controller 606 outputs data to devices other than the display device in some examples, e.g. a locally connected printing device (not shown in FIG. 6).

Alternatively or in addition to the other examples described herein, examples include any combination of the following:

Clause A. An apparatus comprising: a processor; a memory storing instructions that, when executed by the processor, perform a method comprising: receiving a voicemail message; generating a prompt for an artificial intelligence AI model, wherein the prompt comprises a request for a classification into one of a plurality of classes and audio signal features of the voicemail message; determining whether to delay passing the prompt to the generative AI model; in response to determining to delay, delaying passing the prompt to the generative AI model; passing the prompt to the generative AI model; receiving a classification from the generative AI model; triggering an action on the voicemail message according to the received classification.

Clause B. The apparatus of clause A wherein the audio signal features comprise one or more of: a length of time from a start of a call until an audio signal is above a threshold, anonymized features of a spectrogram computed from an audio signal of the voicemail message Clause C. The apparatus of clause A or B wherein the prompt further comprises one or more of: a transcript of the voicemail message, metadata of the voicemail message.

Clause D. The apparatus of any preceding clause wherein the method further comprises: a first stage analysis of the voicemail message prior to generating the prompt, wherein the first stage analysis comprises classifying the voicemail message into one of the plurality of classes; and in response to the first stage analysis being uncertain, generating the prompt.

Clause E. The apparatus of clause D wherein the first stage analysis comprises one or more of: a custom trained machine learning model, a look-up table, a reputation database Clause F. The apparatus of clause D or E wherein the method further comprises: receiving user input confirming or correcting the classification received from the generative AI model of the voicemail message in the first stage analysis; and updating the first stage analysis using the user input.

Clause G. The apparatus of clause D, E, or F wherein the prompt further comprises data relating to the first stage analysis.

Clause H. The apparatus of any preceding clause wherein the method further comprises: receiving user input confirming or correcting the classification by the generative AI model; and updating the generative AI model using the user input.

Clause I. The apparatus of any preceding clause wherein the method further comprises using one or more of: a learnt usage pattern of a user, a calendar of a user, input from a user, in the determining whether to delay the passing of the prompt.

Clause J. The apparatus of any preceding clause wherein the method further comprises providing a signal to the user, wherein the signal indicates to the user that a classification has not yet been received.

Clause K. The apparatus of clause J wherein the signal provided to the user comprises one or more of: moving the voicemail from a first folder to second folder, a flashing light, an audio signal, a color Clause L. The apparatus of any preceding clause wherein the classification into one of a plurality of classes comprises classifying the message as private according to sentiment analysis of the voicemail message Clause M. The apparatus of any preceding clause wherein the classification into one of a plurality of classes comprises classifying the message as urgent according to sentiment analysis of the voicemail message.

Clause N. The apparatus of any preceding clause wherein the classification into one of a plurality of classes comprises classifying the message as an attempt at a fraudulent activity Clause O. The apparatus of any preceding clause wherein the action comprises one or more of: moving the voicemail message from a first folder to a second folder, adjusting the priority of user notifications relating to the voicemail message, adding an audio prefix to a telephony user interface, reporting the voicemail message, deleting the voicemail message, causing a display light to flash, sending a short messaging service SMS message, displaying the voicemail message in a visual voicemail application in a color corresponding to the classification, displaying the voicemail message in the visual voicemail application in a font corresponding to the classification.

Clause P. The apparatus of any preceding clause wherein the prompt is generated using a script comprising the plurality of classes.

Clause Q. A computer-implemented method comprising: receiving a voicemail message; generating a prompt for a generative artificial intelligence AI model, wherein the prompt comprises a request for a classification into one of a plurality of classes and data related to the voicemail message; determining whether to delay passing the prompt to the generative AI model; in response to determining to delay, delaying passing the prompt to the generative AI model; passing the prompt to the generative AI model; receiving a classification from the generative AI model; and triggering an action on the voicemail message according to the received classification.

Clause R. The method of clause Q wherein the data related to the voicemail message comprises one or more of: a transcript of the voicemail message, metadata of the voicemail message, an audio recording of the voicemail message.

Clause S. The method of clause Q or clause R further comprising: a first stage analysis of the voicemail message prior to generating the prompt, wherein the first stage analysis comprises classifying the voicemail message into one of the plurality of classes; and in response to the first stage analysis being uncertain, generating the prompt.

Clause T. A method for analyzing an audio recording of a voicemail message, the method comprising: obtaining the audio recording of the voicemail message; generating input for a generative artificial intelligence AI model, wherein the input comprises the audio recording of the voicemail message and a request for classification of the audio recording into one of a plurality of classes; determining whether to delay passing the input to the generative AI model; in response to determining to delay, delaying passing the input to the generative AI model passing the input to the generative AI model; receiving the classification from the generative AI model; and performing an action on the voicemail message, wherein the action depends on the classification from the generative AI model.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of example embodiments. Although various embodiments have been described above with a certain degree of particularity, or with reference to one or more individual embodiments, those skilled in the art could make numerous alterations to the disclosed embodiments without departing from the scope of this specification.

The methods herein, which may involve the analysis of voicemails received at an inbox, may and should be enacted with utmost respect for personal privacy. Accordingly, the methods presented herein are fully compatible with opt-in participation of the end users.

What is claimed is:

1. An apparatus comprising:
   a processor;
   a memory storing instructions that, when executed by the processor, cause the apparatus to perform operations comprising:
      receiving a voicemail message;
      generating a prompt for a generative artificial intelligence AI model, wherein the prompt comprises a request for a classification into one of a plurality of classes and audio signal features of the voicemail message;
      determining whether to delay passing the prompt to the generative AI model;
      in response to determining to delay, delaying passing the prompt to the generative AI model;
      passing the prompt to the generative AI model;
      receiving a classification from the generative AI model; and
      triggering an action on the voicemail message according to the received classification.

2. The apparatus as claimed in claim 1, wherein the audio signal features comprise one or more of: a length of time from a start of a call until an audio signal is above a threshold, or anonymized features of a spectrogram computed from an audio signal of the voicemail message.

3. The apparatus as claimed in claim 1, wherein the prompt further comprises one or more of: a transcript of the voicemail message, or metadata of the voicemail message.

4. The apparatus as claimed in claim 1, further comprising instructions that, when executed by the processor, cause the apparatus to perform operations comprising:
   performing a first stage analysis of the voicemail message prior to generating the prompt, wherein the first stage analysis comprises classifying the voicemail message into one of the plurality of classes; and
   in response to the first stage analysis being uncertain, generating the prompt.

5. The apparatus as claimed in claim 4, wherein the first stage analysis comprises one or more of: a custom trained machine learning model, a look-up table, or a reputation database.

6. The apparatus as claimed in claim 4, further comprising instructions that, when executed by the processor, cause the apparatus to perform operations comprising:
   receiving user input confirming or correcting the classification received from the generative AI model of the voicemail message in the first stage analysis; and
   updating the first stage analysis using the user input.

7. The apparatus as claimed in claim 4, wherein the prompt further comprises data relating to the first stage analysis.

8. The apparatus as claimed in claim 1, further comprising instructions that, when executed by the processor, cause the apparatus to perform operations comprising:
   receiving user input confirming or correcting the classification by the generative AI model; and
   updating the generative AI model using the user input.

9. The apparatus as claimed in claim 1, wherein the determining whether to delay passing of the prompt comprises using one or more of: a learned usage pattern of a user, a calendar of a user, or input from a user.

10. The apparatus as claimed in claim 1, further comprising instructions that, when executed by the processor, cause the apparatus to perform operations comprising providing a signal to a user, wherein the signal indicates to the user that a classification has not yet been received.

11. The apparatus as claimed in claim 10, wherein the signal provided to the user comprises one or more of: moving the voicemail from a first folder to second folder, a flashing light, an audio signal, a color.

12. The apparatus as claimed in claim 1, wherein the classification into one of a plurality of classes comprises classifying the message as private according to sentiment analysis of the voicemail message.

13. The apparatus as claimed in claim 1, wherein the classification into one of a plurality of classes comprises classifying the message as urgent according to sentiment analysis of the voicemail message.

14. The apparatus as claimed in claim 1, wherein the classification into one of a plurality of classes comprises classifying the message as an attempt at a fraudulent activity.

15. The apparatus as claimed in claim 1, wherein the action comprises one or more of: moving the voicemail message from a first folder to a second folder, adjusting a priority of user notifications relating to the voicemail message, adding an audio prefix to a telephony user interface, reporting the voicemail message, deleting the voicemail message, causing a display light to flash, sending a short messaging service SMS message, displaying the voicemail message in a visual voicemail application in a color corresponding to the classification, or displaying the voicemail message in the visual voicemail application in a font corresponding to the classification.

16. The apparatus as claimed in claim 1, wherein the prompt is generated using a script comprising the plurality of classes.

17. A computer-implemented method comprising:
- receiving a voicemail message;
- generating a prompt for a generative artificial intelligence AI model, wherein the prompt comprises a request for a classification into one of a plurality of classes and data related to the voicemail message;
- determining whether to delay passing the prompt to the generative AI model;
- in response to determining to delay, delaying passing the prompt to the generative AI model;
- passing the prompt to the generative AI model;
- receiving a classification from the generative AI model; and
- triggering an action on the voicemail message according to the received classification.

18. The method as claimed in claim 17, wherein the data related to the voicemail message comprises one or more of: a transcript of the voicemail message, metadata of the voicemail message, or an audio recording of the voicemail message.

19. The method as claimed in claim 17 further comprising:
- performing a first stage analysis of the voicemail message prior to generating the prompt, wherein the first stage analysis comprises classifying the voicemail message into one of the plurality of classes; and
- in response to the first stage analysis being uncertain, generating the prompt.

20. A method for analyzing an audio recording of a voicemail message, the method comprising:
- obtaining the audio recording of the voicemail message;
- generating input for a generative artificial intelligence AI model, wherein the input comprises the audio recording of the voicemail message and a request for classification of the audio recording into one of a plurality of classes;
- determining whether to delay passing the input to the generative AI model;
- in response to determining to delay, delaying passing the input to the generative AI model;
- passing the input to the generative AI model;
- receiving the classification from the generative AI model; and
- performing an action on the voicemail message, wherein the action depends on the classification from the generative AI model.

* * * * *